July 4, 1933. F. W. EDWARDS ET AL 1,917,190

MECHANICAL LUBRICATOR WITH INDIVIDUAL MOTOR DRIVE

Filed Oct. 30, 1929 3 Sheets-Sheet 2

Inventors
Frank William Edwards
Fordyce B. Farnsworth
by Wm. H. Finckel
Attorney July 4, 1933. F. W. EDWARDS ET AL 1,917,190
MECHANICAL LUBRICATOR WITH INDIVIDUAL MOTOR DRIVE
Filed Oct. 30, 1929 3 Sheets-Sheet 3

Inventors
Frank William Edwards
Fordyce B. Farnsworth
by M. H. Finckel
Attorney

Patented July 4, 1933

1,917,190

UNITED STATES PATENT OFFICE

FRANK WILLIAM EDWARDS, OF CHICAGO, ILLINOIS, AND FORDYCE B. FARNSWORTH, OF WADSWORTH, OHIO, ASSIGNORS TO THE OHIO INJECTOR COMPANY OF ILLINOIS, OF CHICAGO, ILLINOIS, A CORPORATION OF ILLINOIS

MECHANICAL LUBRICATOR WITH INDIVIDUAL MOTOR DRIVE

Application filed October 30, 1929. Serial No. 403,537.

This invention relates to lubricators, especially mechanically operated lubricators of the force-feed type such as that disclosed in the copending applications of Frank William Edwards and Fordyce B. Farnsworth, for Lubricators, filed September 10, 1928, Serial No. 304,862, and filed August 15, 1930, Serial No. 475,528, and the invention has special reference to the combination with such a lubricator of a motor for driving same, thus providing, in effect, a unitary lubricator and motor drive therefor such as may be used in an installation of the type disclosed in the copending application of Frank William Edwards, for Lubricating apparatus, filed October 26, 1929, Serial No. 402,719.

The object of the invention is to combine with a mechanical lubricator a motor for supplying power whereby the operating mechanism of such lubricator may be driven in such manner that the lubricator and its individual motor form, in effect, a unitary apparatus capable of installation and operation at any point remote from those sources of power usually employed for operating lubricators of this character.

To this end, the invention contemplates the combination with a mechanical lubricator of a motor, preferably an electric motor, for driving the operating mechanism of such lubricator, the casing of the lubricator and the casing of the motor being provided with complemental means whereby the motor may be attached to and supported upon the lubricator to form in effect a unit therewith, means including a speed reduction gearing for operatively connecting the motor shaft with the operating mechanism of the lubricator, and a bearing and supporting housing for such gearing preferably forming a part of the motor casing and extending within the lubricator casing. Thus the lubricator and driving motor are combined as a unit and power is imparted by the motor to the operating mechanism of the lubricator through the gearing, as we will proceed now more particularly to explain and finally claim.

Figure 1:
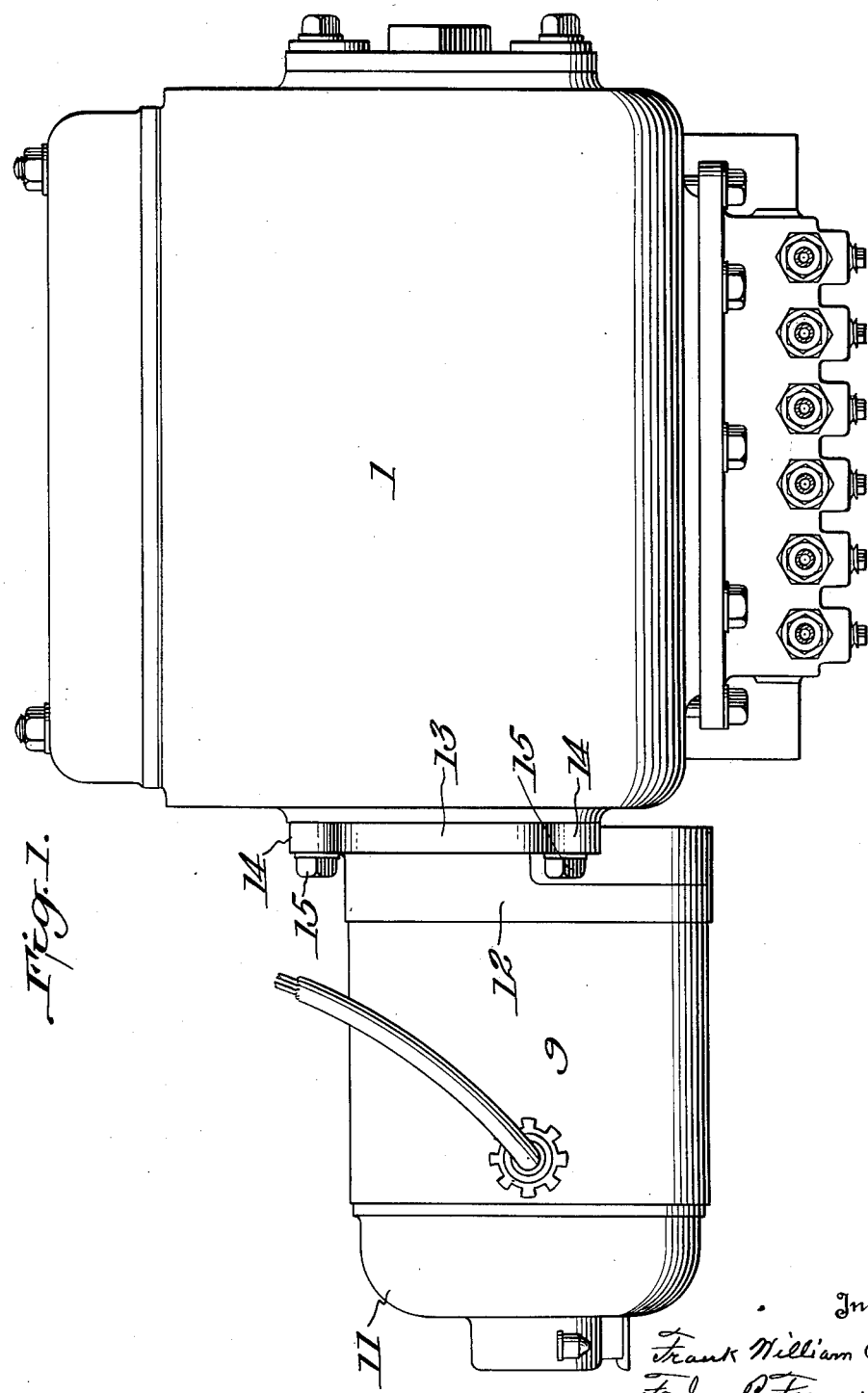
Figure 2:
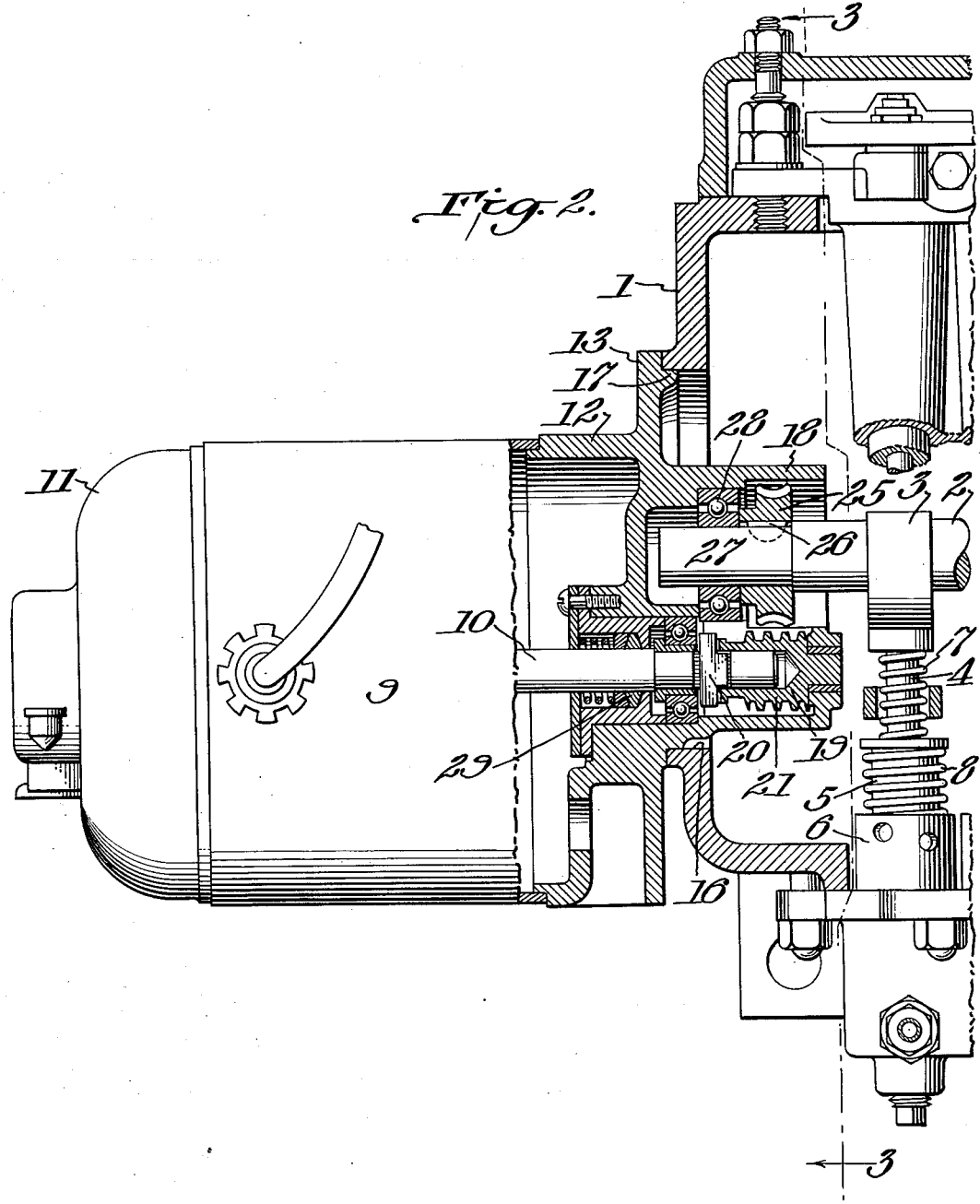
Figure 3:
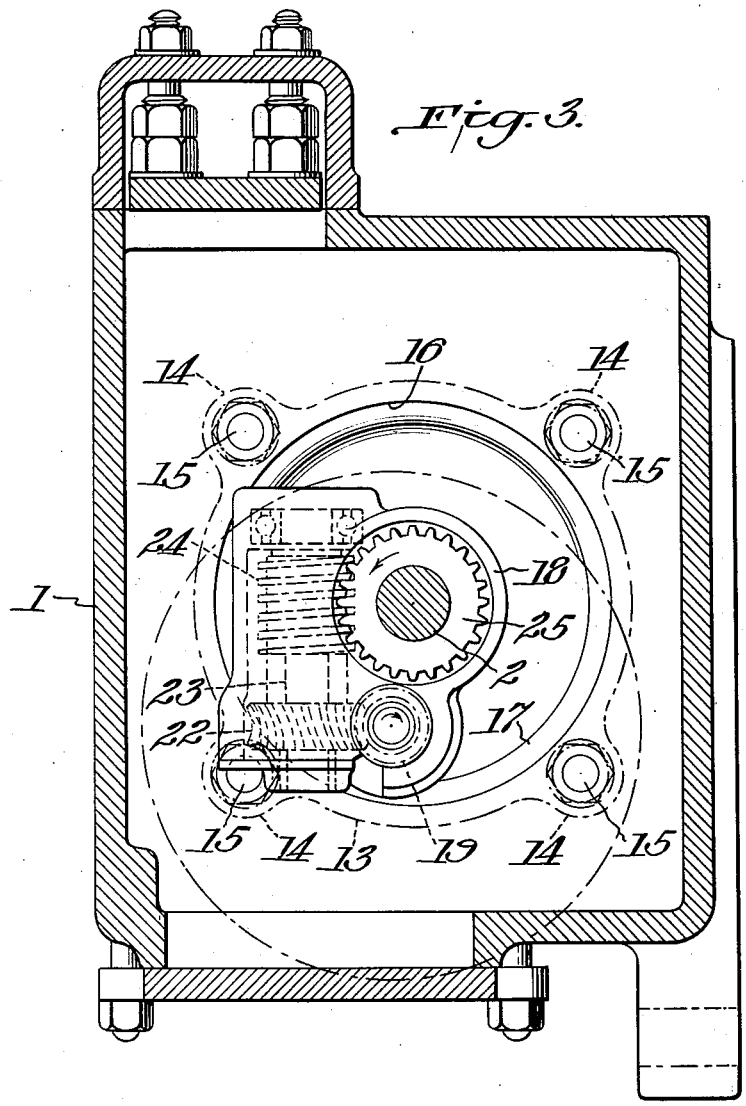

In the accompanying drawings illustrating the invention, in the several figures of which like parts are similarly designated, Figure 1 is a side elevation of a lubricator and driving motor therefor embodying the principles of our invention. Fig. 2 is an enlarged fragmentary sectional elevation showing the details of the connection between the motor casing and lubricator casing and the speed reducing gearing for transmitting power from the motor to the lubricator. Fig. 3 is a sectional elevation taken substantially in the plane of line 3—3, Fig. 2.

Lubricators of the type referred to have a casing 1 which provides a lubricant reservoir and within which are mounted the mechanical elements whereby the pumping or forcing and measuring of the lubricant are performed. These elements include as essential parts of the mechanism a shaft 2 carrying a plurality of cams 3 which cooperate with push rods 4 to impart the forcing stroke to plungers or pistons 5 operating in cylinders 6, the push rods and plungers being returned by means of springs 7 and 8 respectively.

Obviously, in order that these parts may function, some means must be provided for imparting rotative movement, either intermittent or continuous, to the cam shaft 2. As shown in the applications Serial No. 304,862 and Serial No. 475,528 hereinabove referred to, such motion is imparted by means of a lever adapted to be oscillated by some reciprocating part of a machine to which the lubricator is applied (such as a locomotive), this lever imparting, through the medium of a pawl and ratchet mechanism, an intermittent or step-by-step rotary movement to the cam shaft. In the present instance, however, we have provided an electric motor 9 having a shaft 10 for imparting continuous rotation to the cam shaft 2 so long as the motor 9 is operated. This motor 9 may be of any approved or usual form, having a casing provided with end caps of conventional type one of which is shown at 11. In order to associate this motor in proper driving relation with the lubricator, we replace the end cap at the front axial end of the motor with a specially designed end cap 12 provided with a boss 13 having attaching lugs 14 (see Fig. 3) through which cap-screws 15 may pass to secure the cap 12 and the motor 9 carried by it to the end of the casing 1 of the lubricator. This end of the lubricator casing may be provided with an aperture 16 within which a centering boss 17 of the end cap 12 fits. The connection between the end cap 12 and the casing 1 of the lubricator will, obviously, be such as to prevent leakage of oil from the casing of the lubricator, which, as hereinbefore stated, is the lubricant reservoir.

The rotation of the cam shaft 2 must, in order to produce the desired operation of the lubricator be relatively slow, and as the speed of rotation of an electric motor is much greater than that desired for the rotation of the cam shaft, it is necessary to interpose between the shaft 10 of the motor shown and the cam shaft 2 of the lubricator a speed reducing gearing. In the embodiment shown in the drawings, we have provided a speed reducing gearing of double reduction worm and wheel type and have so formed the end cap 12 of the motor as to provide a bearing housing 18 in which this speed reducing gearing is mounted and by means of which it is arranged within the lubricator casing 1 in operative relation to one end of the cam shaft 2. The speed reducing gearing shown comprises a worm 19 having appropriate bearings in the housing 18 and keyed as shown at 20 on the slotted end 21 of the motor shaft 10. With this worm 19 (see Fig. 3) meshes a worm wheel 22 fixed on a shaft 23 having suitable bearings in the housing 18, and carrying also a worm 24 which meshes with a worm wheel 25 mounted in an open-ended portion of the housing 18 and keyed as by means of the Woodruff key 26, (see Fig. 2) to the end 27 of cam shaft 2 which has a suitable bearing 28 in the housing 18. By means of this connection between the motor shaft 10 and the cam shaft 2 the desired reduction of speed may be obtained, in the instance shown a reduction of 200 to 1.

As will be seen in Figs. 2 and 3, the open end of the housing 18 affords a means of open communication whereby the lubricant contained in the casing 1 or reservoir of the lubricator may have access to the several bearings carried by the housing 18 and to the speed reducing gearing therein, thus making unnecessary the provision of means whereby such bearings and gearing may be lubricated from outside of the apparatus.

An oil tight automatic packing 29 is used around the motor shaft 10 to prevent escape of oil from the lubricator casing 1 into the motor casing around the shaft 10.

By means of the elements described, it will be seen that we produce an assembly by which an individual driving motor is rigidly attached to a mechanical lubricator, and by which the power supplied by the motor in the form of rotary motion may be transmitted to the operating mechanism of the lubricator by means of gearing providing an appropriate speed ratio between the motor or driving shaft and the driven or cam shaft of the lubricator mechanism.

We accomplish the desired combination of a lubricator and an individual driving motor supported in appropriate juxtaposition thereto by removing from the motor one of its usual end caps or bells and substituting therefor an end cap having such form and characteristics that it not only serves as an end cap for the motor to replace the customary end cap, but also as a means for connecting the motor to and rigidly mounting it upon the lubricator in predetermined desired relation thereto and, in addition, provides a bearing housing adapted to extend within the casing of the lubricator into appropriate proximity to the operating mechanism of the lubricator and containing and supporting gearing whereby the rotation of the motor shaft may be imparted to the operating mechanism of the lubricator in a desired speed ratio. Moreover, the arrangement of the open-ended housing 18 within the lubricant reservoir provides an assembly in which the speed reducing gearing and its various shafts and bearings may be self-lubricating by reason of their direct communication with the lubricant within the reservoir or casing 1 of the lubricator.

Various changes are contemplated as within the spirit of the invention and the scope of the following claims.

What we claim is:—

1. The combination with a mechanical lubricator having a casing and a drive shaft, of an individual drive mechanism therefor including a motor and gearing, and a casing for said motor having means whereby the motor is supported upon the casing of the lubricator, said motor casing provided with a housing for said gearing extending within said lubricator casing and including an open-ended bearing member carrying a gear of said gearing with which said drive shaft is engaged in driven relation.

2. The combination with a mechanical lubricator having a casing and a drive shaft, of an individual drive mechanism therefor including a motor and gearing, and a casing for said motor having an end cap provided with means whereby the motor is supported upon the casing of the lubricator, the end cap of said motor casing provided with a housing for said gearing extending within said lubricator casing and including an open-ended bearing member carrying a gear of said gearing with which said drive shaft is engaged in driven relation.

In testimony whereof we have hereunto set our hands Oct. 28 and Oct. 26 A. D. 1929, respectively.

FRANK WILLIAM EDWARDS.
FORDYCE B. FARNSWORTH.